3,312,699
ASYMMETRIC TRIAZINO INDOLES
Jan Mieczyslaw Zygmunt Gladych and John Harold Hunt, London, England, assignors to Allen & Hanburys Limited, London, England, a British company
No Drawing. Filed Sept. 15, 1964, Ser. No. 396,721
Claims priority, application Great Britain, Sept. 17, 1963, 36,551/63; Feb. 20, 1964, 7,169/64
7 Claims. (Cl. 260—249.8)

This invention relates to novel heterocyclic compounds having therapeutic activity, for example, anti-viral activity.

The heterocyclic compounds of the present invention are imidazo-, pyrimido- and triazolo-as-triazino(5,6-b)-indoles, of the general formula:

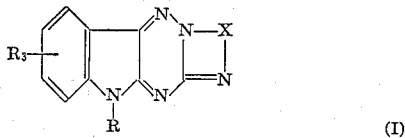

where R is a hydrogen atom or an alkyl or aralkyl radical, $R_3$ is a hydrogen or halogen atom or an alkyl, aralkyl, hydroxy, alkoxy, nitro, amino or trifluoromethyl radical, X is a group of the formula

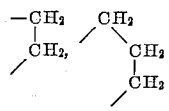

or

wherein $R_1$ is a hydrogen atom, a hydroxy radical, an alkyl radical or a phenyl radical optionally substituted by, for example, one or more halogen atoms and/or one or more alkyl radicals, and their acid addition and quaternary ammonium salts.

According to one embodiment the present invention provides s-triazolo(4′,3′:2,3)-as-triazino(5,6-b)indoles of the general formula:

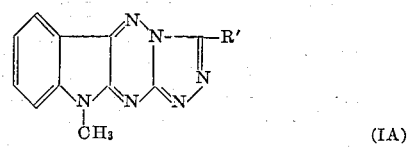

where R′ is a hydrogen atom, a hydroxy radical, an alkyl radical containing from 1 to 8 carbon atoms, preferably 1 to 4 carbon atoms such as a methyl radical or a phenyl radical optionally substituted by, for example, one or more halogen atoms and/or one or more alkyl radicals containing from 1 to 4 carbon atoms, and their acid addition salts.

The compounds in which X is —$CR_1$=N— and $R_1$ is a hydroxy radical can exist in tautomeric forms which can be represented by the following formulae:

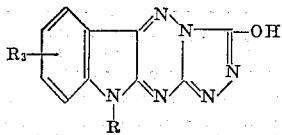

and

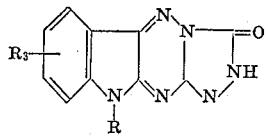

The compounds of the present invention have been found to have useful biological activity. Some of the compounds have been found to possess antiviral activity whilst others for example possess antibacterial activity. The compounds may be employed in the usual forms for therapeutic administration. For example, they may be formulated with a pharmaceutical carrier to provide tablets, capsules, suppositories, injection solutions and the like.

The preferred compounds are 10-methyl-s-triazolo(4′,3′:2,3) - as - triazino(5,6 - b)indole, 3,10 - dimethyl-s - triazolo(4′,3′:2,3) - as - triazino(5,6 - b)indole, 3-hydroxy - 10 - methyl - s - triazolo(4′,3′:2,3) - as - triazino(5,6 - b)indole, 2,3 - dihydro - 10 - methyl - imidazo(1′,2′:2,3) - as - triazino(5,6 - b)indole and 2,3-dihydropyrimido(1′,2′:2,3) - as - triazino(5,6 - b)indole and their acid addition salts.

Our method of testing the compounds is as follows:
Each dose of a sample is added to 8 tubes of confluent cells; 16 hours later a 100 $TCD_{50}$ challenge of virus is added to 4 of the tubes, the other 4 being kept for cytotoxicity controls. With each group of samples 10 tubes are kept as normal tissue controls and 10 are infected with 100 $TCD_{50}$ of virus. After 72 hours the tubes are read microscopically for evidence of virus cytopathic effect.

Using the above test method as above, we found, for example, that 3,10 - dimethyl - s - triazolo(4′,3′:2,3)-as-triazino(5,6 - b)indole at 100 mcg./ml. or less gave complete protection against a 100 $TCD_{50}$ challenge of vaccinia virus in vervet $V_3A$ cells. The same compound at 50 mcg./ml. completely protects H.E.L. cells from a 100 $TCD_{50}$ challenge of Coxsackie A-21 virus, and it is also active against rhinovirus.

Compounds of Formula I in which X is —$CR_1$=N— may be prepared by condensing isatin or a substituted isatin with a 3,4 - diamino - 1,2,4 - triazole of the general formula:

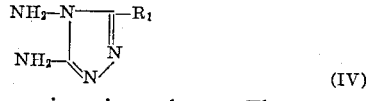

where $R_1$ has the meaning given above. These compounds may be prepared by cyclisation of a 3 - hydrazino-as-triazino(5,6 - b)indole having the general formula

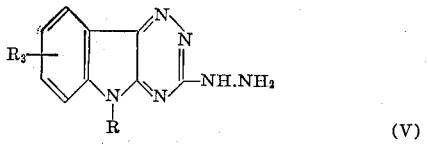

(where $R_1$ and $R_3$ have the meanings given above) with urea or a carboxylic acid of the formula

$R_2COOH$           (VI)

where $R_2$ is a hydrogen atom, an alkyl radical or a phenyl radical optionally substituted by, for example, one or more halogen atoms and/or one or more alkyl radicals.

3-hydrazino-as-triazino(5,6-b)indoles of the general Formula V are described in our copending application Ser. No. 296,727, filed Sept. 15, 1964.

Compounds of Formula I in which X is

—$CH_2.CH_2.CH_2$— or —$CH_2.CH_2$— may be prepared by cyclisation of a 3-(ω-hydroxyalkylamino)-as-triazino(5,6-b)indole of the general formula:

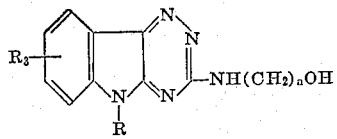

(VII)

(where R and $R_3$ have the meanings given above and $n$ is 2 or 3) with a cyclising agent, for example phosphoryl chloride.

3-(ω-hydroxyalkylamino)-as-triazino(5,6-b) indoles of Formula VII are described in our aforesaid copending application.

The acid addition salts of the bases of the invention may be produced in conventional ways, e.g. by treatment of the base with the appropriate acid and the quaternary ammonium salts may be produced in conventional ways by treatment of the bases with quaternising agents.

The following examples illustrate the invention.

EXAMPLE 1

(a) *Preparation of 10-methyl-s-triazolo(4',3':2,3)-as-triazino(5,6-b)indole*

(i) A solution of 5 g. of 3-hydrazino-5-methyl-as-triazino(5,6-b)indole in 25 ml. of 98% formic acid was boiled under reflux for 2.5 hours. The mixture was then cooled and poured into water. The resulting solid was removed by filtration, washed with water and dried. Two recrystallisations from dimethylformamide gave 10-methyl-s-triazolo(4',3':2,3)-as-triazino(5,6-b)indole as orange needles, M.P. 308 to 309° C. (with decomposition).

(ii) 5.67 g. of 3,4-diamino-1,2,4-triazole hydriodide was added to a solution of sodium ethoxide prepared by dissolving 0.58 g. of sodium in 70 ml. of anhydrous ethanol and the mixture was boiled under reflux for 10 minutes. A hot solution of 4.02 g. of N-methylisatin in 60 ml. of ethanol was added to the hot mixture whereupon a vigorous reaction occurred, an orange solid separating within 1 minute. The mixture was cooled and the solid was removed by filtration, washed with water and ethanol and then dried. Two recrystallisations from dimethylformamide gave 10-methyl-s-triazolo(4',3':2,3)-as-triazino(5,6-b)indole as orange needles, M.P. 307 to 308° C. (with decomposition).

(b) *Preparation of 10-methyl-s-triazolo(4',3':2,3)-as-triazino(5,6-b)indole hydrochloride*

A solution of 0.5 g. of 10-methyl-s-triazolo(4',3':2,3)-as-triazino(5,6-b)indole in 30 ml. of hot dilute hydrochloric acid (about 2 N) was filtered while hot and allowed to cool. The resulting crystals were removed by filtration, washed with acetone and air-dried to give 10-methyl-s-triazolo(4',3':2,3)-as-triazino(5,6-b)indole hydrochloride as reddish-orange crystals, M.P. 299.5 to 300° C. (with decomposition).

(c) *Preparation of 10-methyl-s-triazolo(4',3':2,3)-as-triazino(5,6-b)indole hydrogen maleate*

0.5 g. of 10-methyl-s-triazolo(4',3':2,3)-as-triazino(5,6-b)indole was dissolved in a hot solution of 7 g. of maleic acid in 30 ml. of water. The solution was filtered while hot and then allowed to cool. The resulting crystals were removed by filtration, washed with light petroleum (B.P. 40 to 60° C.) and air-dried to give 10-methyl-s-triazolo(4',3':2,3)-as-triazino(5,6-b)indole hydrogen maleate as reddish orange crystals, M.P. 130.5 to 131.5° C. (with decomposition).

EXAMPLE 2

*Preparation of 3,10-dimethyl-s-triazolo(4',3':2,3)-as-triazino(5,6-b)indole*

A solution of 5 g. of 3-hydrazino-5-methyl-as-triazino(5,6-b)indole in 25 ml. of acetic acid was boiled under reflux for 3 hours. On cooling, the mixture was stirred with 100 ml. of water and the solid was removed by filtration, washed with water and dried. Recrystallisation from dimethyl formamide gave 3,10-dimethyl-s-triazolo(4',3':2,3)-as-triazino(5,6-b)indole as yellow-orange needles, M.P. 331 to 332° C.

EXAMPLE 3

*Preparation of 10-methyl-3-phenyl-s-triazolo(4',3':2,3)-as-triazino(5,6-b)indole*

A mixture of 5 g. of 3-hydrazino-5-methyl-as-triazino(5,6-b)indole and 25 g. of benzoic acid was heated at 140 to 190° C. for 1 hour 25 minutes. The mixture was then cooled, powdered and stirred with ethanol. The resulting solid was removed by filtration, washed with ethanol and dried. Recrystallization from dimethylformamide gave 10-methyl-3-phenyl-s-triazolo(4',3':2,3)-as-triazino(5,6-b)indole as reddish-orange crystals, M.P. 336 to 337° C.

EXAMPLE 4

*Preparation of 3-(p-chlorophenyl)-10-methyl-s-triazolo(4',3':2,3)-as-triazino(5,6-b)indole*

A mixture of 4.25 g. of 3-hydrazino-5-methyl-as-triazino(5,6-b)indole, 20 g. of p-chlorobenzoic acid and 90 ml. of tetrahydronaphthalene was heated at 140 to 190° C. for 30 minutes. On cooling, the solid was removed by filtration, washed with ethanol and stirred with 5% sodium bicarbonate solution. The solid was again removed by filtration, washed with ethanol and dried. Recrystallisation from dimethylformamide gave 3-(p-chlorophenyl)-10-methyl-s-triazolo(4',3':2,3)-as-triazino(5,6-b)indole as orange needles, M.P. 347 to 348° C.

EXAMPLE 5

*Preparation of 3-hydroxy-10-methyl-s-triazolo(4',3':2,3)-as-triazino(5,6-b)indole*

An intimate mixture of 2.14 g. of 3-hydrazino-5-methyl-as-triazino(5,6-b)indole and 1.2 g. of anhydrous urea was heated at 140 to 195° C. for 1 hour. On cooling, the resulting red solid was powdered and made into a slurry with 10 ml. of cold water. It was then removed by filtration, washed with water and dried. Two recrystallisations from dimethylformamide gave 3-hydroxy-10-methyl-s-triazolo(4',3':2,3)-as-triazino(5,6-b)indole as red needles which did not melt below 360° C.

EXAMPLE 6

*Preparation of 2,3-dihydro-10-methyl-imidazo(1',2':2,3)-as-triazino(5,6-b)indole*

A mixture of 3.3 g. of 3-(2-hydroxyethylamino)-5-methyl-as-triazino(5,6-b)indole and 8 ml. of phosphoryl chloride was refluxed for 1 hour. The clear solution was poured on to crushed ice and the precipitated solid was removed by filtration and dried in vacuo. Recrystallisations from dimethylformamide and from a mixture of ethanol and ether gave 2,3-dihydro-10-methyl-imidazo(1',2':2,3)-as-triazino(5,6-b)indole hydrochloride as yellow rosettes, M.P. 331 to 332° C. (with decomposition). The base crystallised from aqueous ethanol as red needles, M.P. 224 to 225° C. (After drying at 90° C.)

EXAMPLE 7

*Preparation of 2,3-dihydropyrimido(1',2':2,3)-as-triazino-(5,6-b)indole*

A solution of 3.3 g. of 3-(3-hydroxypropylamino)-as-triazino(5,6-b)indole in 8 ml. of phosphoryl chloride was refluxed for 1 hour and then poured on to crushed ice.

The solid was removed by filtration, refluxed with 20 ml. of benzene for 10 minutes and then removed by filtration again. The resulting solid was recrystallised from a mixture of dimethylformamide and ether yielding yellow crystals. Two recrystallisations from ethanol gave yellow-orange prisms, M.P. 395 to 395.5° C. (with decomposition). A solution of this solid in hot water was basified with dilute sodium hydroxide solution (2 N) and the precipitated solid was removed by filtration, washed with water and dried. Recrystallisation from ethanol gave 2,3 - dihydropyrimido(1',2':2,3)-as-triazino(5,6-b) indole as orange needles, M.P. 311 to 321° C. (with decomposition).

What is claimed is:

1. A compound selected from the group consisting of an imidazo- pyrimido- and triazolo-as-triazino(5,6-b) indole of the formula:

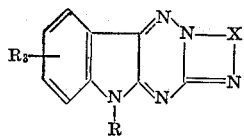

(I)

wherein R is selected from the group consisting of hydrogen, lower alkyl and phenylalkyl of 7 to 9 carbon atoms, $R_3$ is selected from the group consisting of hydrogen, halogen, lower alkyl, benzyl, hydroxy, lower alkoxy, nitro, amino and trifluoromethyl, X is selected from the group consisting of

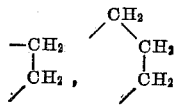

and

in which $R_1$ is selected from the group consisting of hydrogen, hydroxy, lower alkyl, halophenyl and lower alkyl phenyl, and an acid addition and quaternary ammonium salt thereof.

2. A compound selected from the group consisting of a s-triazolo(4',3':2,3)-as-triazino(5,6-b)indole of the formula:

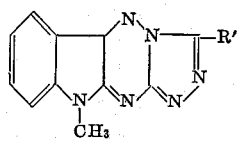

(IA)

wherein R' is selected from the group consisting of hydrogen, hydroxy, lower alkyl of 1 to 8 carbon atoms, phenyl, halophenyl and lower alkyl phenyl, and an acid addition salt thereof.

3. A compound selected from the group consisting of 10 - methyl-s-triazolo(4',3':2,3)-as-triazino(5,6-b)indole, its hydrochloride and hydrogen maleate.

4. 3,10-dimethyl-s-triazolo(4',3':2,3)-as-triazino(5,6-b) indole.

5. 3-hydroxy-10-methyl-s-triazolo(4',3':2,3)-as-triazino (5,6-b)indole.

6. A compound selected from the group consisting of 2,3 - dihydro - 10 - methyl-imidazo(1',2':2,3)as-triazino (5,6-b)indole and its hydrochloride.

7. 2,3 - dihydropyrimido(1',2':2,3)-as-triazino(5,6-b)-indole.

No references cited.

WALTER A. MODANCE *Primary Examiner.*

JOHN M. FORD, *Assistant Examiner.*